United States Patent
Dileon et al.

(10) Patent No.: US 11,220,974 B2
(45) Date of Patent: Jan. 11, 2022

(54) FUEL DISTRIBUTION METHOD

(71) Applicant: VITESCO TECHNOLOGIES GMBH, Hanover (DE)

(72) Inventors: Jérôme Dileon, Toulouse (FR); José Fachin, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/273,840

(22) PCT Filed: Aug. 20, 2019

(86) PCT No.: PCT/EP2019/072281
§ 371 (c)(1),
(2) Date: Mar. 5, 2021

(87) PCT Pub. No.: WO2020/048769
PCT Pub. Date: Mar. 12, 2020

(65) Prior Publication Data
US 2021/0332771 A1    Oct. 28, 2021

(30) Foreign Application Priority Data

Sep. 7, 2018 (FR) .................................... 1858049

(51) Int. Cl.
*F02D 41/38* (2006.01)
*F02D 41/30* (2006.01)

(52) U.S. Cl.
CPC ......... *F02D 41/38* (2013.01); *F02D 41/3005* (2013.01); *F02D 2200/0611* (2013.01)

(58) Field of Classification Search
CPC ................. F02D 41/38; F02D 41/3005; F02D 2200/0611
See application file for complete search history.

(56) References Cited

U.S. PATENT DOCUMENTS 5,325,836 A  7/1994 Orzel et al.
5,941,217 A  8/1999 Cheng et al.
(Continued)

FOREIGN PATENT DOCUMENTS

CN    103320179 A  *  9/2013

OTHER PUBLICATIONS

International Search Report for PCT/EP2019/072281 dated Oct. 16, 2019, 7 pages.
(Continued)

*Primary Examiner* — Joseph J Dallo
(74) *Attorney, Agent, or Firm* — Nixon & Vanderhye

(57) ABSTRACT

Also disclosed is a method for determining the actual ethanol content of a fuel including: a step of collecting data on the instantaneous fuel consumption and on the ethanol content; a step of determining the current cumulative fuel consumption; a step of storing data in two matrices, an ethanol content matrix and a cumulative consumption matrix; a step of determining the value of the actual ethanol content of the fuel to be applied to the injector, the actual content being the value of the ethanol content of the ethanol content matrix having the same abscissa as the lowest cumulative consumption value of the cumulative consumption matrix for which the difference between the current cumulative consumption value and the cumulative consumption value is smaller than the value of a volume V of the duct located between the sensor and the injector.

20 Claims, 3 Drawing Sheets

(56) References Cited

U.S. PATENT DOCUMENTS

| | | | |
|---|---|---|---|
| 8,656,896 B2 | 2/2014 | Sasai et al. | |
| 2008/0244960 A1* | 10/2008 | Fischer | C07C 41/09 |
| | | | 44/302 |
| 2010/0059020 A1* | 3/2010 | Serai | F02M 19/08 |
| | | | 123/458 |
| 2010/0212611 A1* | 8/2010 | Yahagi | F02D 41/0065 |
| | | | 123/3 |
| 2010/0305829 A1* | 12/2010 | Santoso | F02D 19/084 |
| | | | 701/103 |
| 2010/0325945 A1* | 12/2010 | Keuken | C10L 1/125 |
| | | | 44/451 |
| 2012/0227707 A1 | 9/2012 | Sasai et al. | |
| 2013/0269240 A1* | 10/2013 | Turra De vila | C10L 1/1802 |
| | | | 44/307 |
| 2014/0095054 A1 | 4/2014 | Serai et al. | |
| 2019/0309695 A1* | 10/2019 | Morganti | F02D 19/081 |
| 2021/0079868 A1* | 3/2021 | Harkonen | F02D 41/2432 |

OTHER PUBLICATIONS

Written Opinion of the ISA for PCT/EP2019/072281 dated Oct. 16, 2019, 7 pages.

* cited by examiner

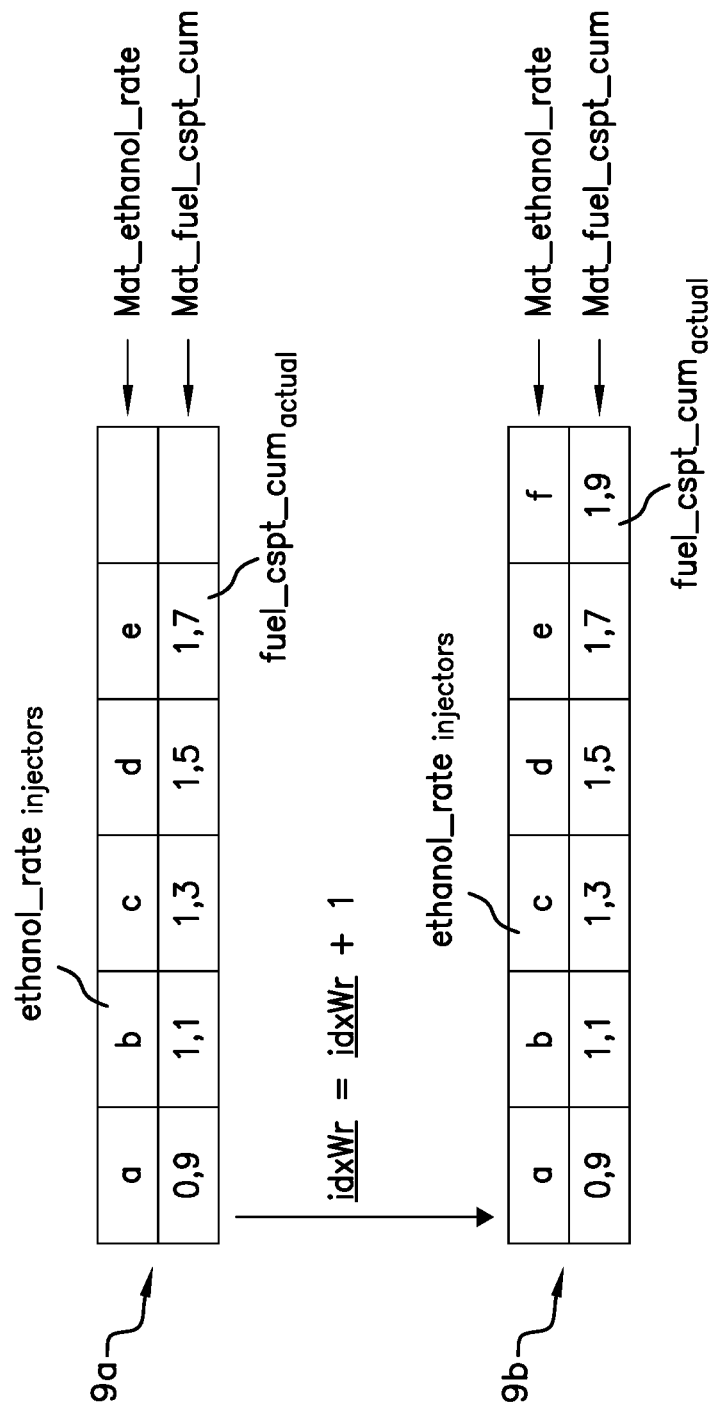

FUEL DISTRIBUTION METHOD

CROSS-REFERENCE TO RELATED APPLICATIONS

This application is the U.S. national phase of International Application No. PCT/EP2019/072281 filed Aug. 20, 2019 which designated the U.S. and claims priority to FR 1858049 filed Sep. 7, 2018, the entire contents of each of which are hereby incorporated by reference.

BACKGROUND OF THE INVENTION

Field of the Invention

The technical field of the present invention is that of devices and methods for controlling the supply of fuel for an internal combustion engine.

Description of the Related Art

Since the arrival on the market of direct-injection gasoline engines that can run on fuel with a variable ethanol content, it is necessary to know, with a high degree of precision, the actual ethanol content of the fuel injected into the combustion chambers of the engines. Specifically, the ethanol content of the fuel makes it possible to determine the amount of fuel to be injected so as to achieve complete combustion of the fuel/air mixture and thus optimize engine performance. Indeed, incomplete combustion will impact engine performance, durability, as well as fuel consumption and environmental pollution.

This type of engine is necessarily equipped with a sensor for measuring the ethanol content of the fuel. However, due to its intrinsic characteristics, such a sensor can be positioned only in a location where the fuel pressure is low, that is to say between the fuel tank and the fuel injector. Thus, there is a delay between the ethanol content measured by the sensor and the ethanol content actually injected into the engine. This delay has to be taken into account so as not to disrupt the running of the engine when there is a transition in the ethanol content that occurs in the event of a change of fuel.

One of the strategies used currently consists in:

detecting a potential change of fuel by comparing the fuel level in the tank before and after each engine start using a level sensor, if the level at engine start is higher than the level recorded at stop, a filling of the tank is detected and the cumulative instantaneous fuel consumption is reset, when this cumulative fuel consumption is higher than a threshold corresponding to the volume of fuel in the circuit between the tank and the sensor, the strategy saves the measurement of the ethanol content for 10 minutes and the ethanol content taken into account in the engine control parameters is frozen at the last measured value, when the cumulative fuel consumption reaches a second threshold corresponding to the volume of fuel in the circuit between the tank and the injectors, the strategy restores the save of the preceding measurement in the ethanol content taken into account in the engine control parameters, once this restore has been carried out, therefore after 10 min, the ethanol content taken into account in the engine control parameters is the measured value.

The ethanol content transition period is crucial and it is important to correctly translate the transition seen at the ethanol content sensor to the injectors. However, the strategy described above does not take into account the fact that the ethanol content transition at the injectors is slower than at the sensor, or the effect of consumption on the transition speed. There is therefore an error in the ethanol content translated to the injectors because the ethanol content transition seen by the sensor is reproduced at the injectors with the same speed as that seen at the sensor. The error becomes greater if the fuel consumption varies between the phase of the sensor learning the ethanol content and the phase of reproduction at the injectors.

Another drawback of this strategy lies in the fact that the detection of the transition of the ethanol content is based on a variation in the fuel level in the tank. As a result, if the filling of the tank is not detected following an anomaly in the tank fuel level sensor or following filling of the tank with the engine running for example, the strategy will not be activated. This may lead to the engine flooding, making it impossible to restart. In addition, in the case of filling the tank with the same fuel, the strategy will still be activated along with the associated limitations even though this is not necessary.

US patent 2010/0059020 describes a device and a method for controlling the supply of fuel to an internal combustion engine. The method makes it possible to translate, to the injectors, the measurement of the ethanol content taken by an ethanol content sensor located between the tank and the injectors. The method consists in dividing the volume located between the sensor and the injector into a number N of imaginary cells. There are therefore N cells, the first of which corresponds to the sensor and the last of which corresponds to the injector. Each time the fuel consumption exceeds the volume of a cell, the method translates the measured ethanol content and does so up to the cell corresponding to the injector. The passing of the ethanol content from one cell to the next is therefore carried out each time the fuel consumption reaches the value of the volume of a cell.

One of the drawbacks of this method lies in the fact that the data translated to the injectors are not immediate. Specifically, there is a latency time between the measurement of the first ethanol content and the translation of the "corrected" ethanol content to the injectors. This latency time is dependent on the number of imaginary cells located between the sensor and the injectors, and on the rate of fuel consumption. In addition, the rate of data acquisition is directly dependent on the number of imaginary cells, which implies that, depending on the rate of consumption, the data are not acquired at regular intervals. In this method, the data are acquired according to the rate of fuel consumption and not at regular time intervals.

SUMMARY OF THE INVENTION

The aim of the present invention is to overcome the aforementioned drawbacks and to propose a method that makes it possible to improve the representativeness of the transition in the ethanol content to the injectors from the measurement at the ethanol content sensor.

The invention therefore relates to a method for determining the actual ethanol content of a fuel to be applied to an injector of an internal combustion engine comprising:

a first step of collecting data on the instantaneous fuel consumption and on the ethanol content at an ethanol sensor inserted into a duct located between a fuel tank and the injector, a second step of determining the current cumulative fuel consumption, said current cumulative consumption being equal to the sum of the instantaneous consumption obtained in the first step and of the last cumulative consumption value, a third step of storing the data obtained in the first and second steps in two matrices, a first matrix of the ethanol content and a second matrix of the cumulative consumption, the two matrices having a common abscissa such that each cumulative consumption value corresponds to an ethanol content value, a fourth step of determining the value of the actual ethanol content of the fuel to be applied to the injector, said actual content being the value of the ethanol content of the ethanol content matrix having the same abscissa as the lowest cumulative consumption value of the cumulative consumption matrix for which the difference between the current cumulative consumption value and said cumulative consumption value is smaller than the value of a volume V of the duct located between the sensor and the injector, a fifth step consisting in applying the actual ethanol content to the injector so as to inject the amount of fuel required for complete combustion.

According to another feature of the invention, the method comprises a sixth step carried out after the fourth step consisting in applying a first-order filter to the actual ethanol content obtained in the fourth step so as to obtain a corrected actual ethanol content.

According to yet another feature of the invention, each of the matrices comprises N cells.

Advantageously, the difference between the maximum ethanol content value of the ethanol content matrix and the minimum ethanol content value of the ethanol content matrix is compared with a predetermined threshold value so as to detect a start and/or an end of a fuel transition period.

According to yet another feature of the invention, the data in the first step are collected at regular time intervals.

According to yet another feature of the invention, the common abscissa is an index corresponding to a data acquisition time interval.

The invention also relates to an engine control unit characterized in that it is configured for the implementation of the method as disclosed.

One advantage of the present invention lies in the improvement in the accounting for the time between the measurement of the ethanol content and it being taken into account in the engine control unit.

Another advantage of the present invention lies in the improvement in engine stability during a fuel transition.

Yet another advantage of the present invention lies in the elimination of the risk of false error detection in the fuel circuit and the risk of engine instability.

Yet another advantage of the present invention lies in the robustness of the detection of a change of fuel.

Yet another advantage of the present invention lies in the reduction in emissions of particles harmful to the environment.

Yet another advantage of the present invention lies in the reduction in emissions of particles harmful to humans.

Another advantage of the present invention lies in the optimization of fuel consumption.

BRIEF DESCRIPTION OF THE DRAWINGS

Other features, advantages and details of the invention will be better understood from reading the additional description which follows of embodiments given by way of example with reference to the drawings, in which:

FIG. 3 is an example of cumulative consumption and ethanol content matrices.

DESCRIPTION OF THE PREFERRED EMBODIMENTS

The present invention is suitable for being used in engines that are able to run on a fuel composed of gasoline, alcohol such as ethanol or a mixture of gasoline and alcohol. Such engines consist in particular of a tank connected to the injectors by a duct. For a better understanding of the invention, the method according to the invention will be described with reference to an engine comprising one injector. Thus, the fuel is brought from the tank to the injector by means of a pump via the duct and the injector allows the desired quantity of fuel to be injected into the combustion chamber so as to obtain complete combustion of the fuel according to a stoichiometric air/fuel ratio.

The amount of fuel required for complete combustion depends on the ethanol content of the fuel used. An ethanol content sensor is therefore inserted at the duct so as to determine the ethanol content of the fuel passing through the duct. Measuring the ethanol content is especially critical during an ethanol content transition period, that is to say when the tank is filled with fuel having a different ethanol content from that already present in the tank.

The engine also comprises an engine control unit. This unit receives and stores instantaneous fuel consumption and fuel ethanol content data, in particular from the ethanol content sensor. The engine control unit processes the data collected and determines the ethanol content to be applied to the injector according to the ethanol content measured by the sensor. The engine control unit also controls the injector so as to inject the required amount of fuel into the combustion chamber based on the ethanol content of the fuel to be applied to the injector.

Figure 1:
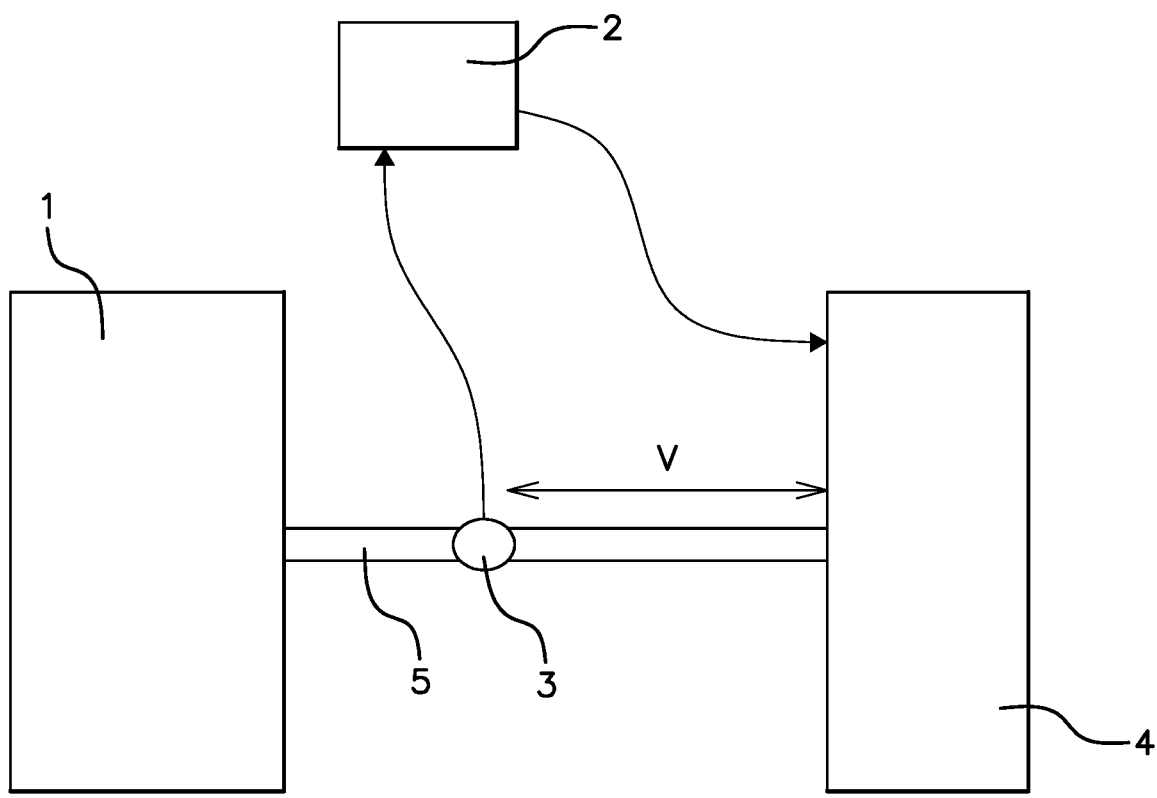
FIG. 1 is a schematic view of an engine according to the invention.

FIG. 1 shows a motor suitable for being used to implement the method according to the invention. As described above, it comprises a fuel tank 1 connected to an injector 4 by a duct 5, an ethanol content sensor 3 located at the duct 5 and an engine control unit 2. V denotes the volume of the duct 5 located between the sensor 3 and the injector 4.

The ethanol content sensor 3 measures the ethanol content of the fuel passing through the duct 5 at regular time intervals. Said ethanol content sensor thus makes it possible to collect data on the ethanol content. This type of sensor is known to those skilled in the art.

The instantaneous fuel consumption is determined at regular time intervals according to techniques well known to those skilled in the art. The instantaneous consumption may in particular be determined from the setpoint for the amount of fuel to be injected into the combustion chamber.

The ethanol content and instantaneous consumption data are collected in the same interval. This means that for an ethanol content datum there is a corresponding instantaneous consumption datum.

The injector 4 allows the desired amount of fuel to be injected into a combustion chamber (not shown in FIG. 1). It is in the combustion chamber that the combustion of the fuel takes place in the presence of air according to a stoichiometric air/fuel ratio. As mentioned above, the objective is to achieve complete combustion of the fuel so as to minimize the emission of harmful particles but also to protect the various components of the engine. This stoichiometric air/fuel ratio is directly dependent on the ethanol content of the fuel used. It is 14.5 for pure gasoline and 9 for pure ethanol.

The engine control unit 2 allows the instantaneous consumption and ethanol content data to be stored, processed and translated to the injector 4 Said engine control unit 2 comprises in particular a data storage means, a data processing means and an injector control means.

The engine control unit 2 allows the steps of the method according to the invention to be carried out. In particular, it allows the ethanol content and instantaneous fuel consumption data to be collected.

From the instantaneous consumption data, the engine control unit 2 determines the current cumulative fuel consumption. This current cumulative consumption is equal to the sum of the current instantaneous consumption and of the last cumulative consumption value. If the control unit has only one instantaneous consumption value, the current cumulative consumption is equal to the instantaneous consumption. As soon as the engine control unit 2 has a plurality of cumulative consumption values, the current cumulative consumption is distinguished from the other cumulative consumption values. The current cumulative consumption then corresponds to the last cumulative consumption value determined by the engine control unit 2.

The engine control unit 2 also allows the cumulative consumption and ethanol content data to be stored in two matrices having a common abscissa such that each cumulative consumption value corresponds to an ethanol content value. Thus, for an ethanol content value measured by the ethanol content sensor at a given time, there is a corresponding cumulative consumption value determined at the same time. According to one particular embodiment of the method according to the invention, the common abscissa is the index corresponding to the data acquisition time interval. Preferably, the data are collected at regular time intervals. According to another embodiment of the invention, each of the matrices comprises N cells.

The construction of the matrices will be explained in more detail in the remainder of the description.

From the matrices, the engine control unit 2 determines the actual ethanol content to be applied to the injector. This actual ethanol content to be applied to the injector corresponds to the value of the ethanol content of the ethanol content matrix having the same abscissa as the lowest cumulative consumption value of the cumulative consumption matrix for which the difference between the current cumulative consumption value and said cumulative consumption value is smaller than the value of the volume V of the duct located between the sensor and the injector.

The engine control unit 2 then translates the actual fuel ethanol content to the injector, which makes it possible to calculate the correct air/fuel ratio and therefore to inject the amount of fuel required for perfect combustion.

As described above, it is known that the speed of transition of the fuel ethanol content at the ethanol content sensor 3 and at the injector 4 is not the same. This is due to the difference in volume between the duct 3 and the injector 4.

Thus, according to one preferred embodiment of the process according to the invention and to remedy this difference in transition speed, a first-order filter is applied to the actual ethanol content obtained previously. This type of first-order filter is known to those skilled in the art and the filtering constant applied depends on the operating point of the engine. Said engine operating point may be characterized by a number of constants such as air flow rate, engine speed and instantaneous fuel consumption.

Applying this filter to the actual ethanol content makes it possible to obtain a corrected actual ethanol content.

Figure 2:
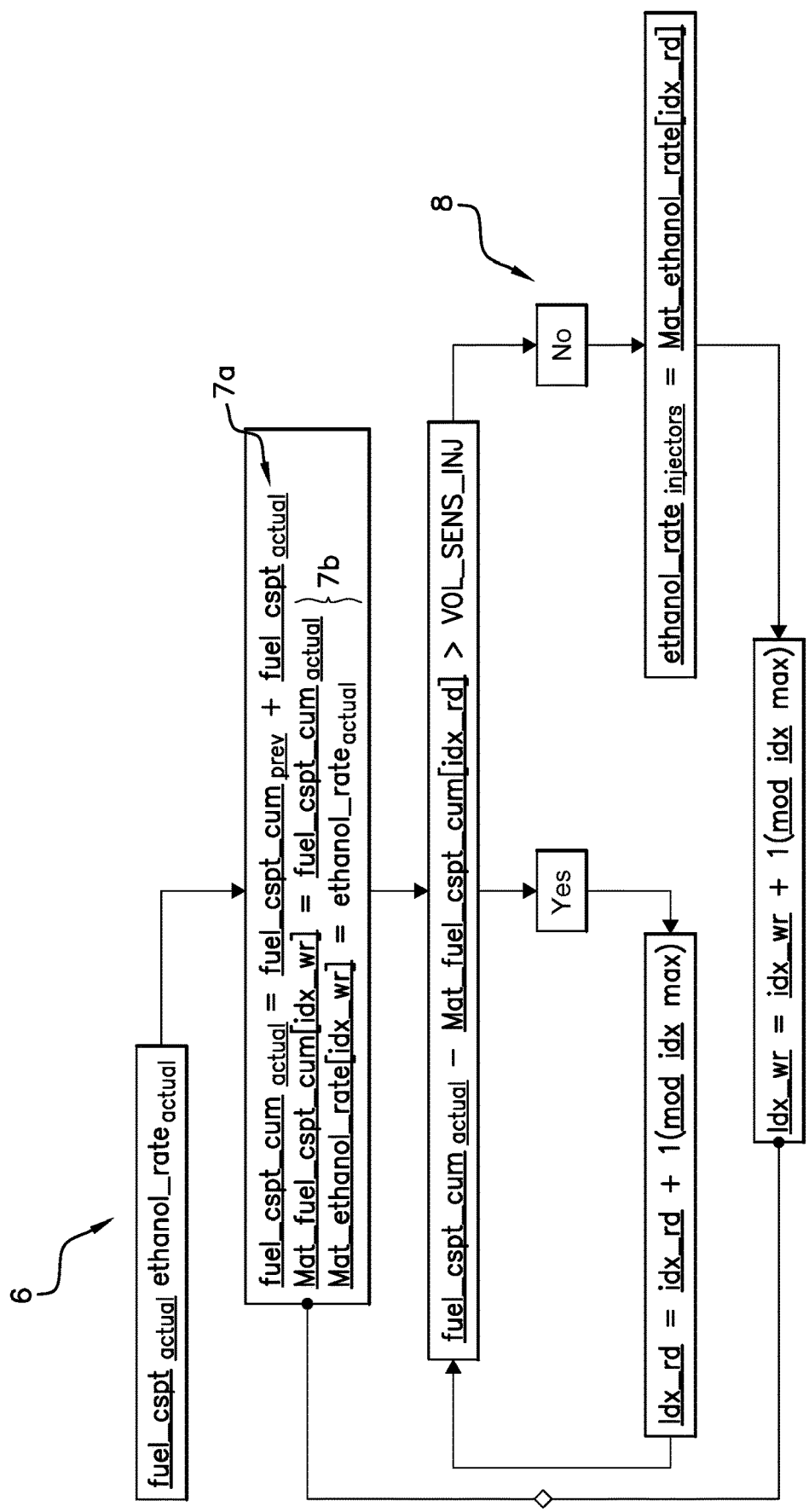
FIG. 2 shows, in the form of a flowchart, the method according to one embodiment of the invention.

FIG. 2 shows, in the form of a flowchart, the method according to one embodiment of the invention.

The first step 6 consists in collecting instantaneous consumption (fuel_cspt$_{actual}$) and ethanol content (ethanol_rate$_{actual}$) data. The ethanol content is measured using an ethanol sensor inserted into the duct 5 located between the fuel tank 1 and the injector 4.

The second step 7a consists in determining the current cumulative fuel consumption (fuel_cspt_cum$_{actual}$). Said current cumulative consumption (fuel_cspt_cum$_{actual}$) is equal to the sum of the instantaneous consumption obtained previously (fuel_cspt$_{actual}$) and the last cumulative consumption value (fuel_cspt_cum$_{prev}$).

The third step 7b consists in storing the data obtained in the first and second steps in two matrices, a first, ethanol content matrix (Mat_ethanol_rate=ethanol_rate$_{actual}$) and a second, cumulative consumption matrix (Mat_fuel_cspt_cum=Fuel_cspt_cum$_{actual}$). The two matrices have a common abscissa ([idx_wr]) such that each cumulative consumption value corresponds to an ethanol content value. According to one particular embodiment of the method according to the invention, the common abscissa is the index corresponding to the data acquisition time interval. Preferably, the data are collected at regular time intervals. According to yet another embodiment of the invention, each of the matrices comprises N cells.

The fourth step 8 consists in determining the value of the actual ethanol content of the fuel to be applied to the injector (ethanol_rate$_{injectors}$). Said actual content (ethanol_rate$_{injectors}$) is the value of the ethanol content of the ethanol content matrix (Mat_ethanol_rate[idx_rd]) having the same abscissa as the lowest cumulative consumption value of the cumulative consumption matrix (Mat_fuel_cspt_cum[idx_rd]) for which the difference between the current cumulative consumption value (Fuel_cspt_cum$_{actual}$) and said cumulative consumption value (Mat_fuel_cspt_cum[idx_rd]) is smaller than the value of a volume V (VOL_SENS_INJ) of the duct located between the sensor and the injector.

As described in FIG. 2, for a cumulative consumption datum of the cumulative consumption matrix (Mat_fuel_cspt_cum[idx_rd]), it is checked whether the difference between the current cumulative consumption value (Fuel_cspt_cum$_{actual}$) and said cumulative consumption value (Mat_fuel_cspt_cum[idx_rd]) is smaller than the value of the volume V (VOL_SENS_INJ) of the duct located between the sensor and the injector. If the difference is greater, then the next cell of the cumulative consumption matrix is checked (idx_rd=idx_rd+1). If the difference is smaller, then the actual ethanol content is the ethanol content value of the ethanol content matrix (ethanol_rate$_{injectors}$=Mat_ethanol_rate [idx_rd]) having the same abscissa as said cumulative consumption value (Mat_fuel_cspt_cum[idx_rd]).

Once the actual ethanol content has been determined, a new calculation step is carried out so as to supplement the two matrices with new data (idx_wr=idx_wr+1 (mod_idx_max). In a simplified manner, the first, second, third, fourth and fifth steps of the method according to the invention are reiterated.

Thus, in each calculation step and therefore in each data acquisition interval, the actual ethanol content to be applied to the injector is determined.

According to one preferred embodiment of the invention, a first-order filter is applied to the actual ethanol content obtained previously. This type of first-order filter is known to those skilled in the art and the filtering constant applied depends on the operating point of the engine. Said engine operating point may be characterized by a number of constants such as air flow rate, engine speed and instantaneous fuel consumption.

Applying this filter to the actual ethanol content makes it possible to obtain a corrected actual ethanol content. According to yet another embodiment of the invention, in each calculation step, the difference between the maximum ethanol content value of the ethanol content matrix and the minimum ethanol content value of the ethanol content matrix is compared with a predetermined threshold value so as to detect a start and/or an end of a fuel transition period. If the difference is greater than the predetermined threshold, a fuel transition period is detected. If the difference is smaller than the predetermined threshold, an end of the fuel transition period is detected. This embodiment allows a change of fuel to be detected reliably and accurately. The change is detected on the basis of the ethanol content of the fuel rather than on the basis of the fuel level in the tank as was the case before. This considerably lowers the risk of false detections of a change of fuel.

FIG. 3 shows an example of cumulative consumption and ethanol content matrices. This example makes it possible to more concretely visualize the method for determining the actual ethanol content to be applied to the injector. In this example, the volume V between the sensor and the injector is 0.7 L. The two matrices each comprise N cells and have a common abscissa.

In the first matrix pair 9a, the current cumulative consumption value is the last value determined by the method (fuel_cspt_cum$_{actual}$); it is 1.7. Thus, the value of the ethanol content of the ethanol content matrix having the same abscissa as the lowest cumulative consumption value of the cumulative consumption matrix for which the difference between the current cumulative consumption value and said cumulative consumption value is smaller than the value of a volume V of the duct located between the sensor and the injector is the value b. The first-order filter may then be applied to this value.

In the second matrix pair 9b, the current cumulative consumption value is the last value determined by the method (fuel_cspt_cum$_{actual}$); it is 1.9. Thus, the value of the ethanol content of the ethanol content matrix having the same abscissa as the lowest cumulative consumption value of the cumulative consumption matrix for which the difference between the current cumulative consumption value and said cumulative consumption value is smaller than the value of a volume V of the duct located between the sensor and the injector is the value c. The first-order filter may then be applied to this value.

The invention claimed is:

1. A method for determining the actual ethanol content of a fuel to be applied to an injector of an internal combustion engine comprising:
    a first step of collecting da to on the instantaneous fuel consumption and on the ethanol content at an ethanol sensor inserted into a duct located between a fuel tank and the injector,
    a second step of determining the current cumulative fuel consumption, said current cumulative consumption being equal to the sum of the instantaneous consumption obtained in the first step and of the last cumulative consumption value,
    a third step of storing the data obtained in the first and second steps in two matrices, a first matrix of the ethanol content and a second matrix of the cumulative consumption, the two matrices having a common abscissa such that each cumulative consumption value corresponds to an ethanol content value,
    a fourth step of determining the value of the actual ethanol content of the fuel to be applied to the injector, said actual content being the value of the ethanol content of the ethanol content matrix having the same abscissa as the lowest cumulative consumption value of the cumulative consumption matrix for which the difference between the current cumulative consumption value and said cumulative consumption value is smaller than the value of a volume V of the duct located between the sensor and the injector,
    a fifth step consisting in applying the actual ethanol content to the injector so as to inject the amount of fuel required for complete combustion.

2. The method as claimed in claim 1, further comprising a sixth step carried out after the fourth step consisting in applying a first-order filter to the actual ethanol content obtained in the fourth step so as to obtain a corrected actual ethanol content.

3. The method as claimed in claim 1, wherein each of the matrices comprises N cells.

4. The method as claimed in claim 3, wherein the difference between the maximum ethanol content value of the ethanol content matrix and the minimum ethanol content value of the ethanol content matrix is compared with a predetermined threshold value so as to detect a start and/or an end of a fuel transition period.

5. The method as claimed in claim 1, wherein the data in the first step are collected at regular time intervals.

6. The method as claimed in claim 5, wherein the common abscissa is an index corresponding to a data acquisition time interval.

7. An engine control unit configured for the implementation of a method as claimed in claim 1.

8. The method as claimed in claim 2, wherein each of the matrices comprises N cells.

9. The method as claimed in claim 2, wherein the data in the first step are collected at regular time intervals.

10. The method as claimed in claim 3, wherein the data in the first step are collected at regular time intervals.

11. The method as claimed in claim 4, wherein the data in the first step are collected at regular time intervals.

12. An engine control unit configured for the implementation of a method as claimed in claim 2.

13. An engine control unit configured for the implementation of a method as claimed in claim 3.

14. An engine control unit configured for the implementation of a method as claimed in claim 4.

15. An engine control unit configured for the implementation of a method as claimed in claim 5.

16. An engine control unit configured for the implementation of a method as claimed in claim 6.

17. The method as claimed in claim 8, wherein the data in the first step are collected at regular time intervals.

18. An engine control unit configured for the implementation of a method as claimed in claim 8.

19. An engine control unit configured for the implementation of a method as claimed in claim 9.

20. An engine control unit configured for the implementation of a method as claimed in claim 10.

* * * * *